Figure 1:
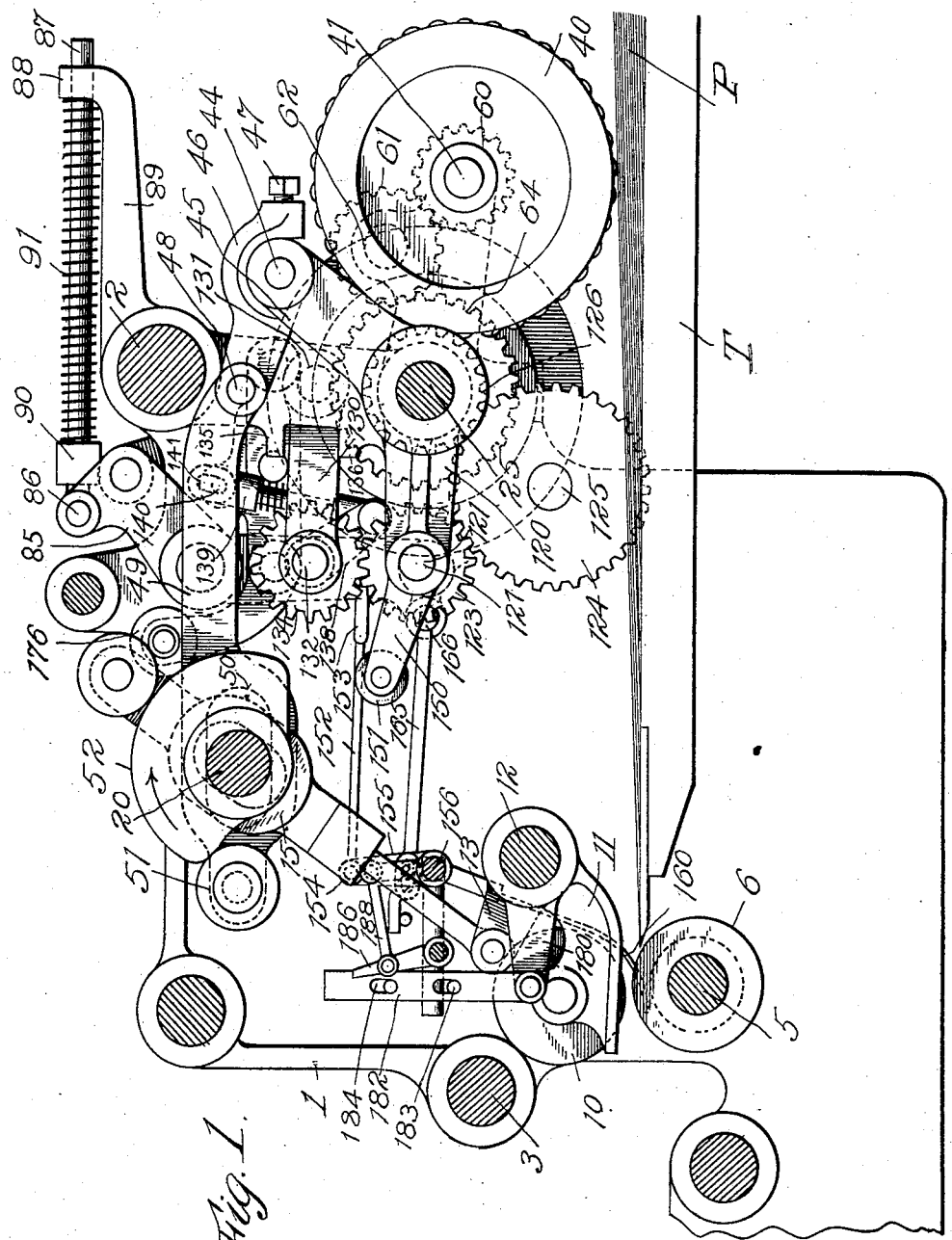

T. C. DEXTER.
PAPER FEEDING MACHINE.
APPLICATION FILED APR. 30, 1909.

965,693.

Patented July 26, 1910.
10 SHEETS—SHEET 4.

Witnesses
Wm A. Courtland
Ray J. Ernst.

Talbot C. Dexter
Inventor,
By his Attorneys Knight Bros.

T. C. DEXTER.
PAPER FEEDING MACHINE.
APPLICATION FILED APR. 30, 1909.
965,693.
Patented July 26, 1910.
10 SHEETS—SHEET 5.
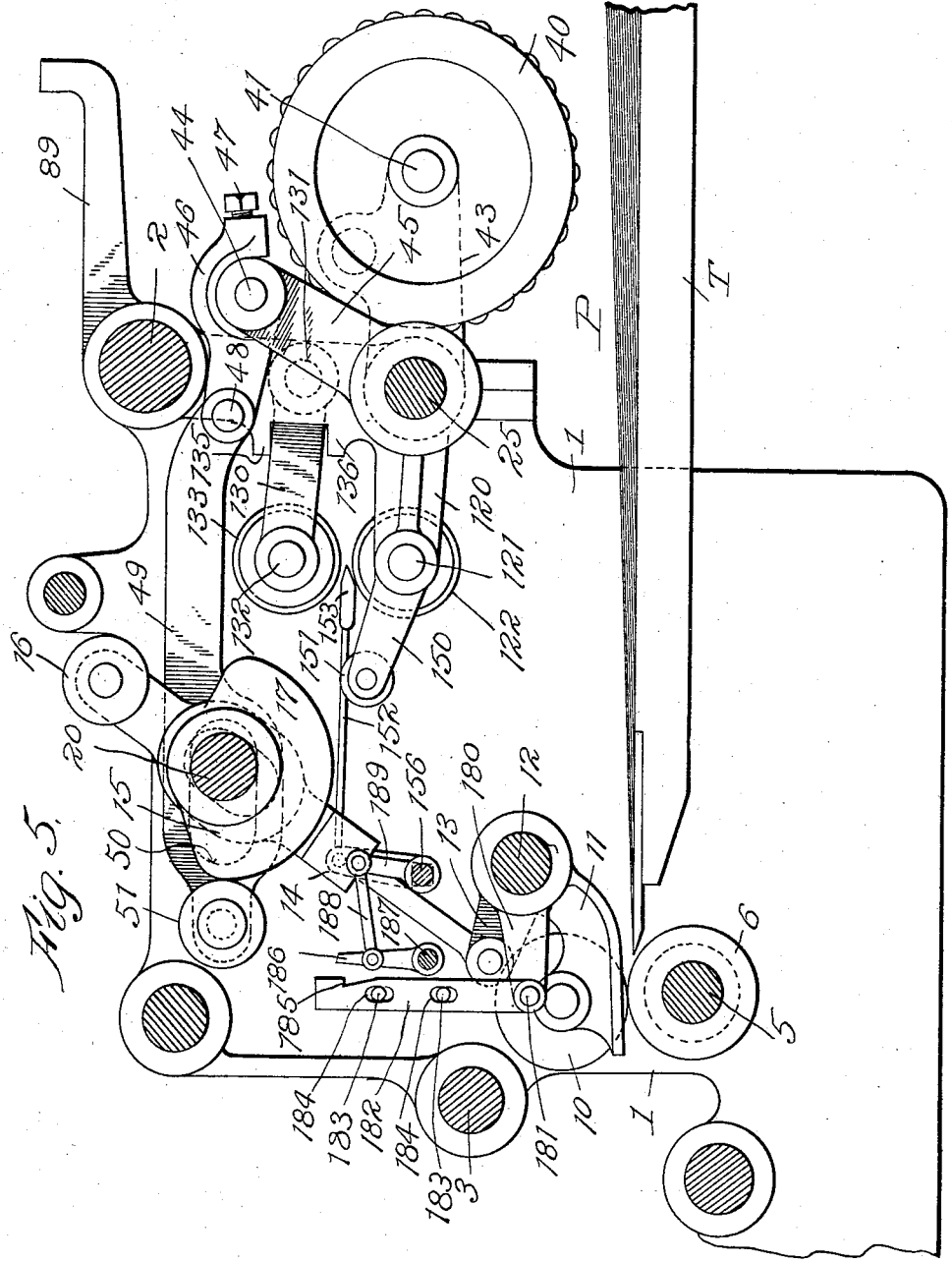

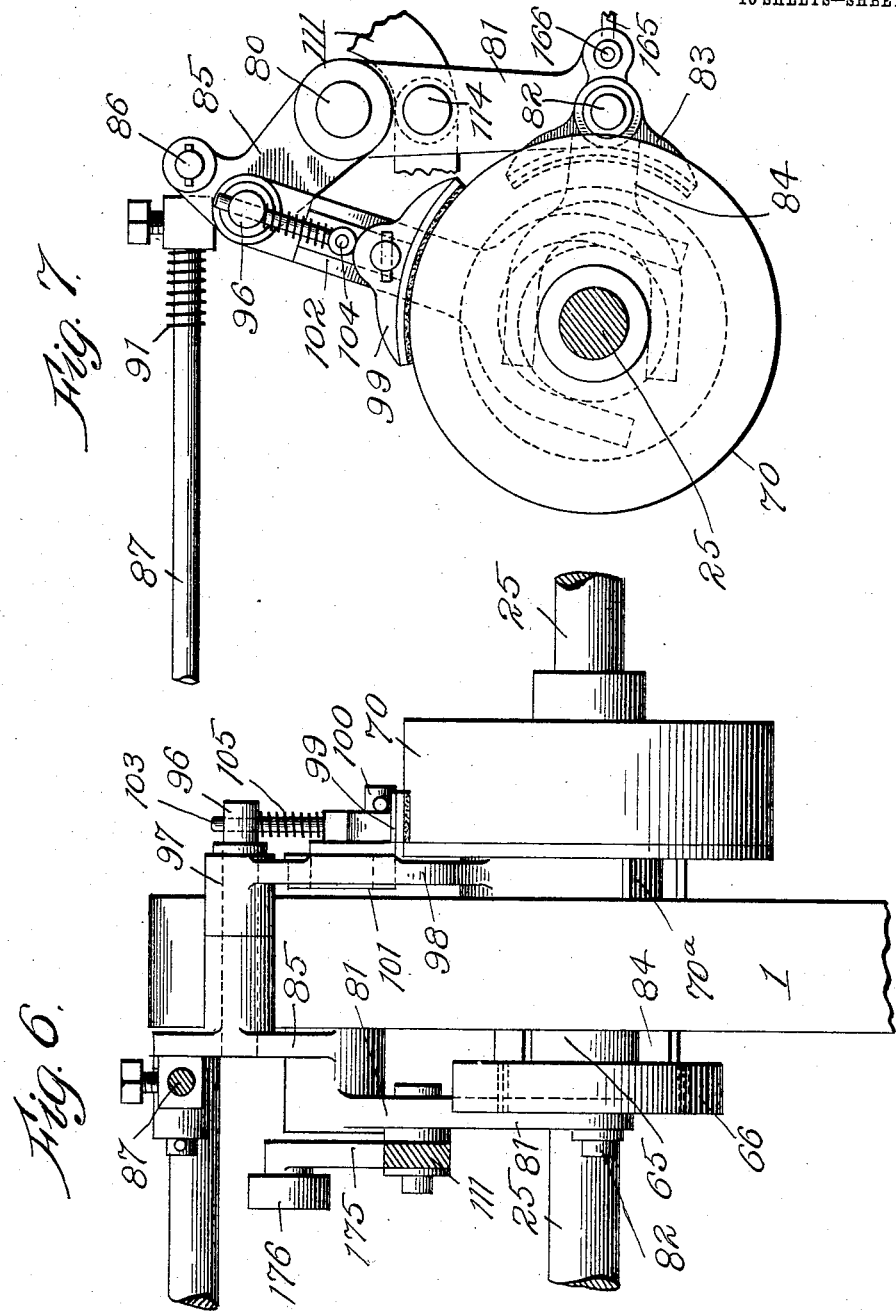

T. C. DEXTER.
PAPER FEEDING MACHINE.
APPLICATION FILED APR. 30, 1909.
965,693.
Patented July 26, 1910
10 SHEETS—SHEET 7.
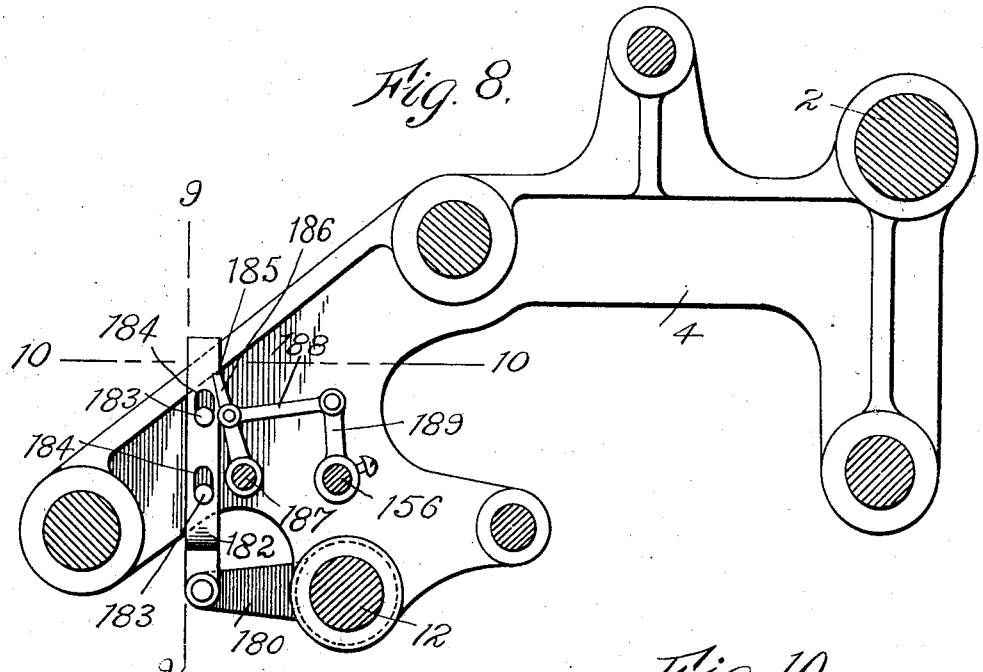
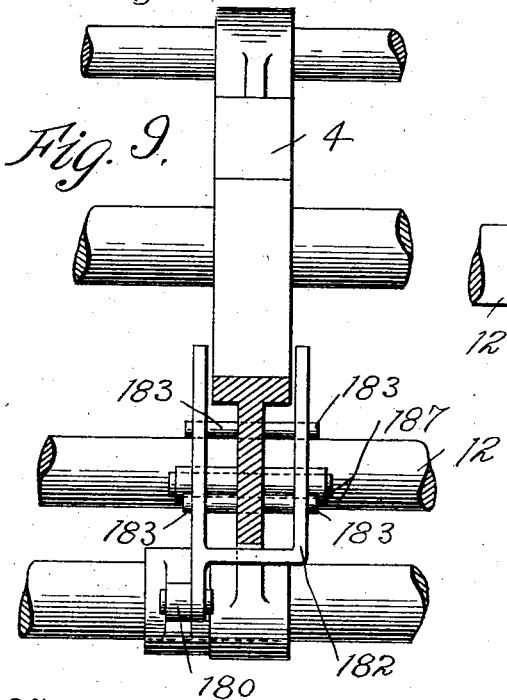
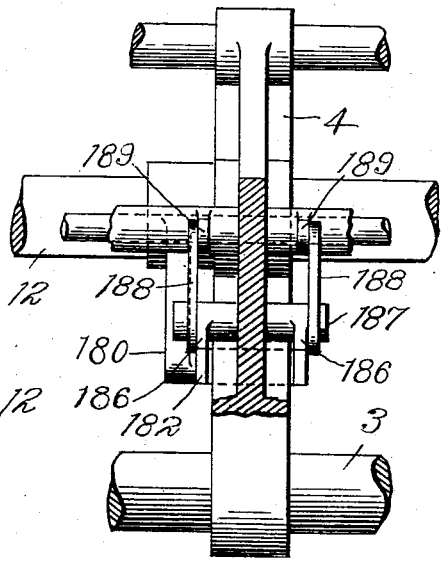
Witnesses:
Wm A. Courtland
Ray T. Ernst
Talbot C. Dexter
Inventor,
By his Attorneys Knight Bros.
THE NORRIS PETERS CO., WASHINGTON, D. C.

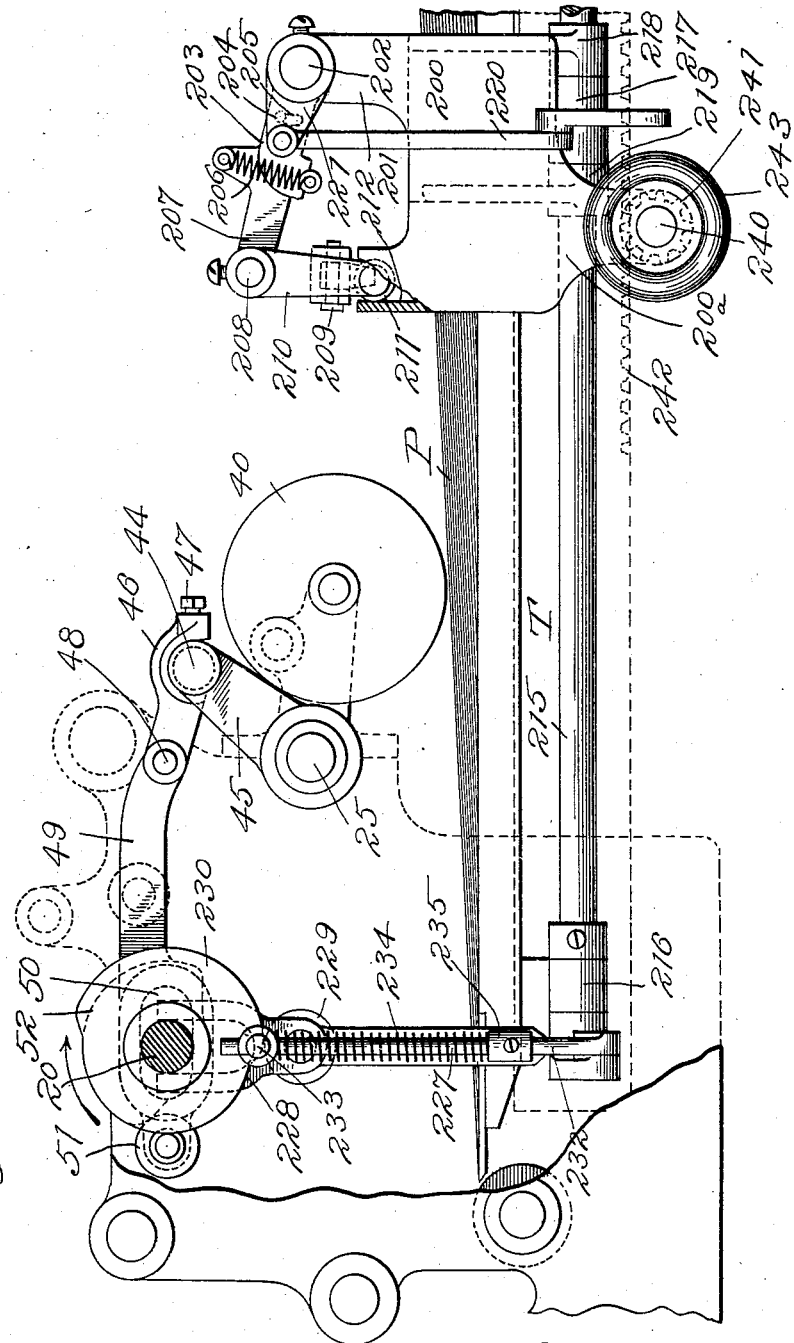

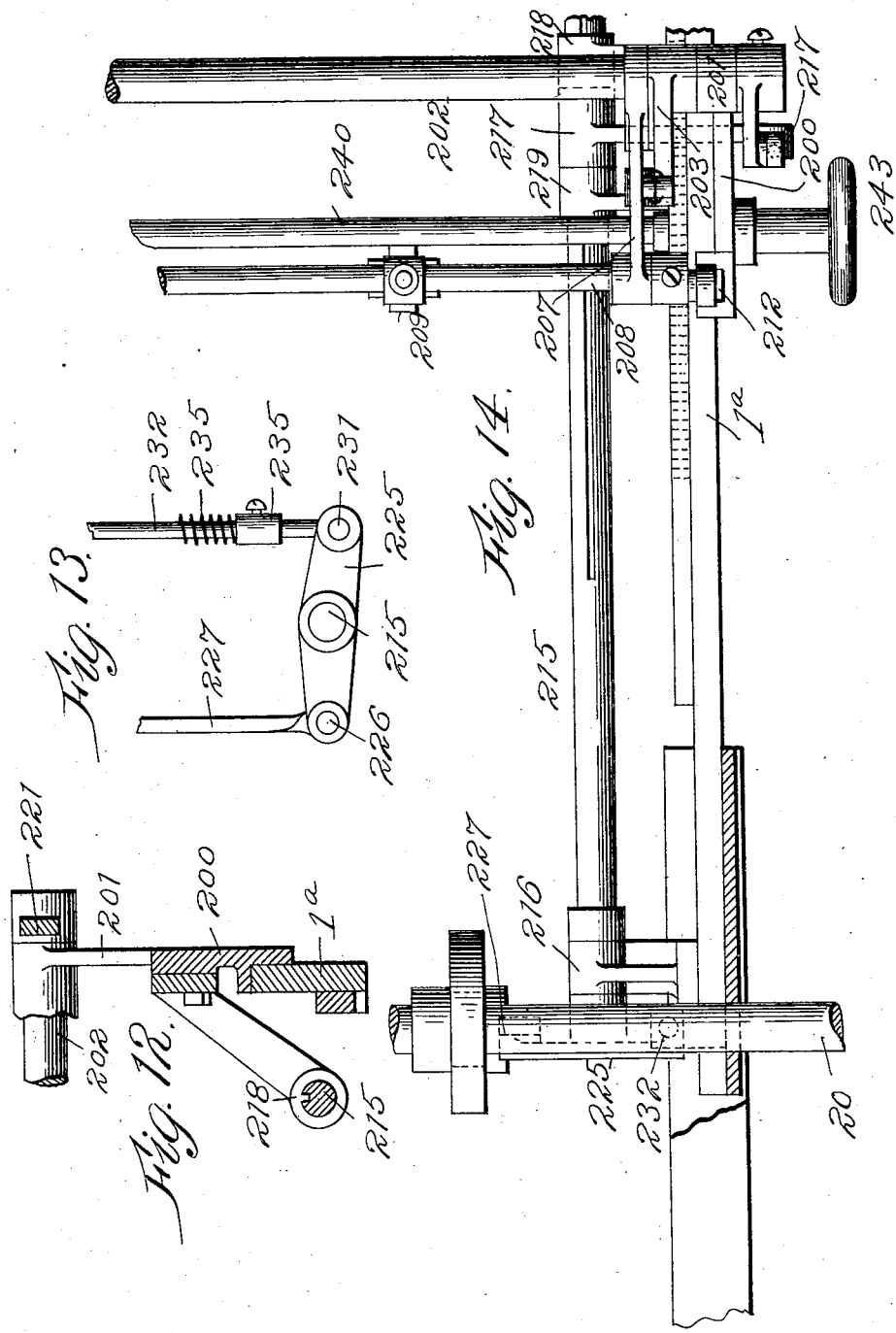

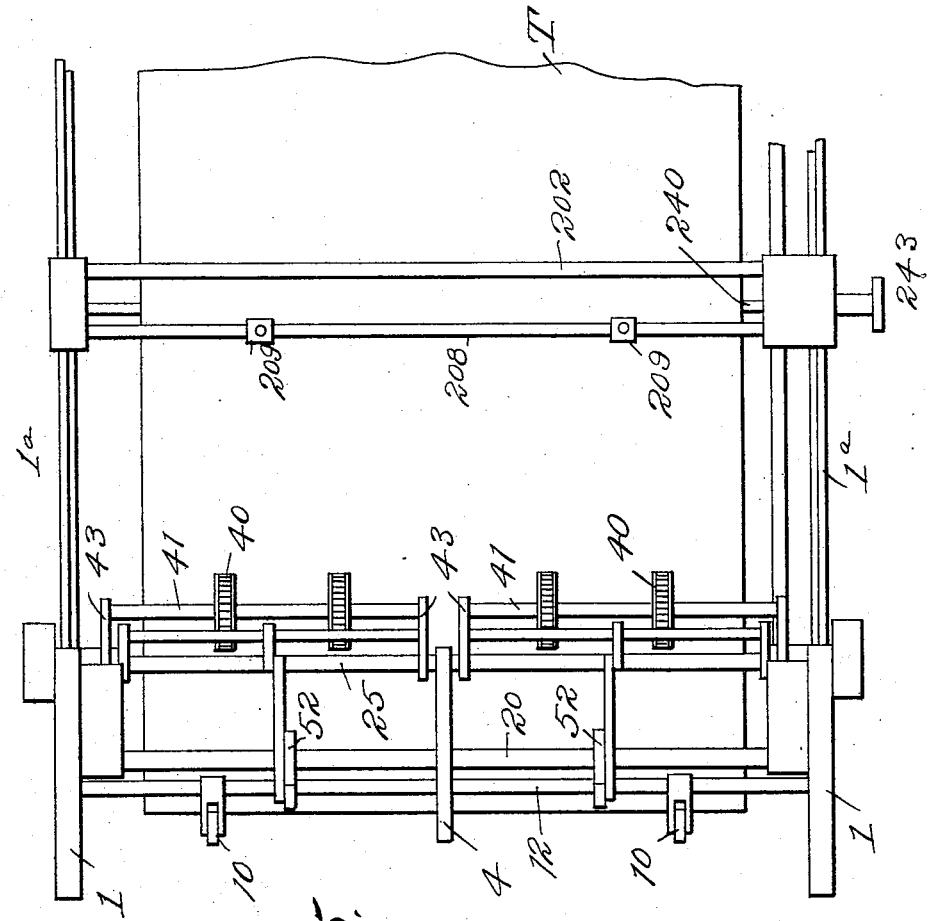

UNITED STATES PATENT OFFICE.

TALBOT C. DEXTER, OF PEARL RIVER, NEW YORK, ASSIGNOR TO DEXTER FOLDER COMPANY, OF PEARL RIVER, NEW YORK, A CORPORATION OF NEW YORK.

PAPER-FEEDING MACHINE.

965,693.  Specification of Letters Patent.  Patented July 26, 1910.

Application filed April 30, 1909. Serial No. 493,172.

*To all whom it may concern:*

Be it known that I, TALBOT C. DEXTER, a citizen of the United States, residing at Pearl River, in the county of Rockland and State of New York, have invented certain new and useful Improvements in Paper-Feeding Machines, of which the following is a specification.

My present invention relates to improvements in paper feeding machines of the sheet combing type in which a bank of sheets is acted upon by combing wheels which comb or feather out the top sheets of the bank to gradually separate the successive sheets near the top to facilitate the periodic withdrawal of the individual sheets from the bank and the feeding of the sheets to any machine arranged to operate upon them.

My present improved machine, in common with prior known machines in this class, includes two sheet combing mechanisms arranged to operate upon the bank of sheets at opposite sides of the machine for feeding the successive sheets forward upon the bank, each combing mechanism being independently controlled by a sheet actuated tripping device so that the successive sheets are approximately squared and registered at the point of delivery from the feeding machine.

My present invention comprises certain structural features to improve the general operation of machines of this class with particular reference to the automatic control and operation of the sheet combing mechanisms, the construction and operation of the tail grips or hold-backs which prevent the forward movement of the bank of sheets as each sheet is delivered, and the control of the drop roller delivery mechanism which takes the successive sheets from the pile.

My present invention may be considered in the light of an improvement upon the machines covered by my pending applications Serial No. 442,753, filed July 9, 1908 and Serial No. 453,948, filed September 21, 1908, both for improvements in paper feeding machines.

In order that my invention may be fully understood, I will first describe the same with reference to the accompanying drawings and afterward point out the novelty more particularly in the annexed claims.

Figure 2:
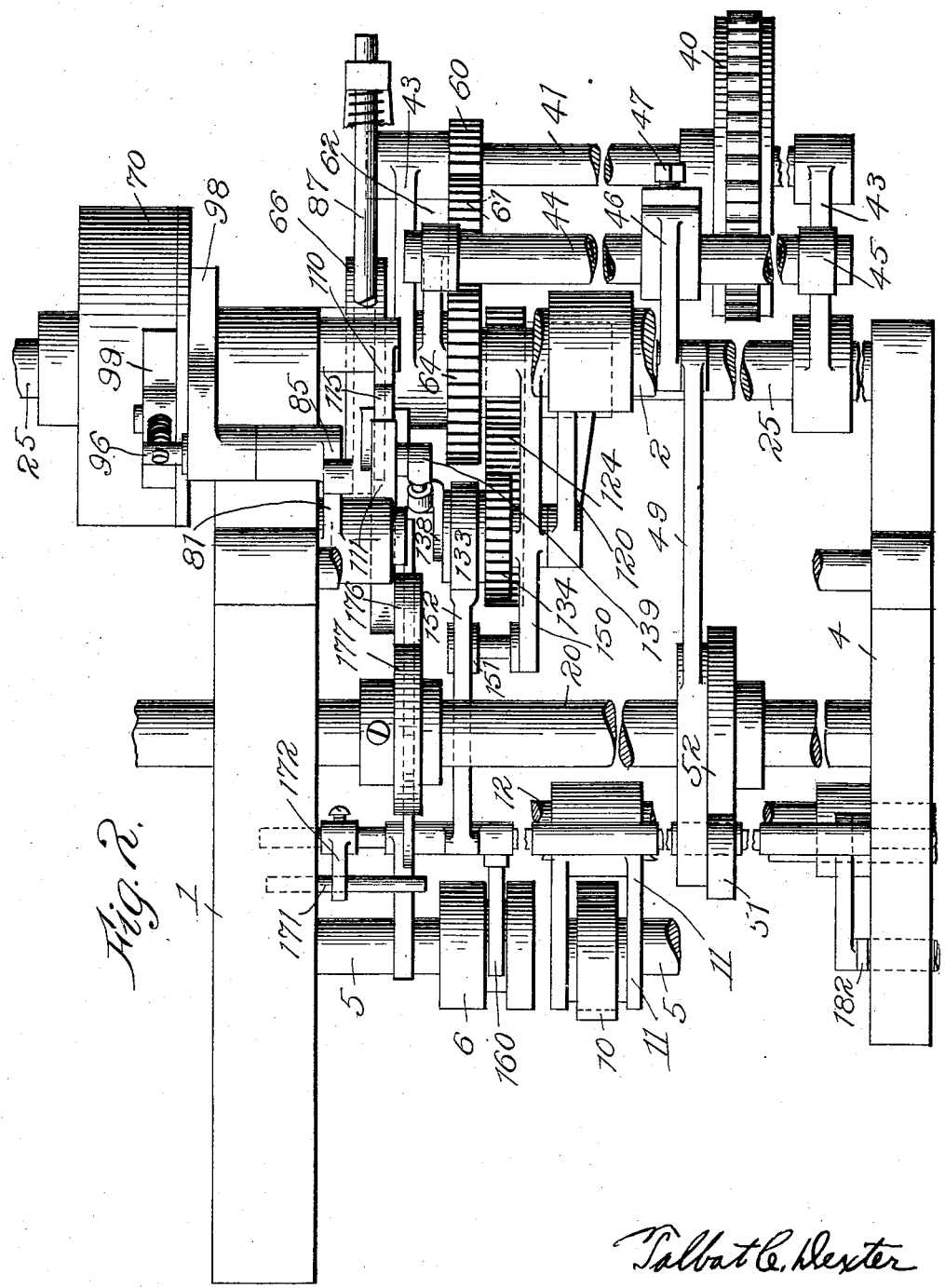
Figure 3:
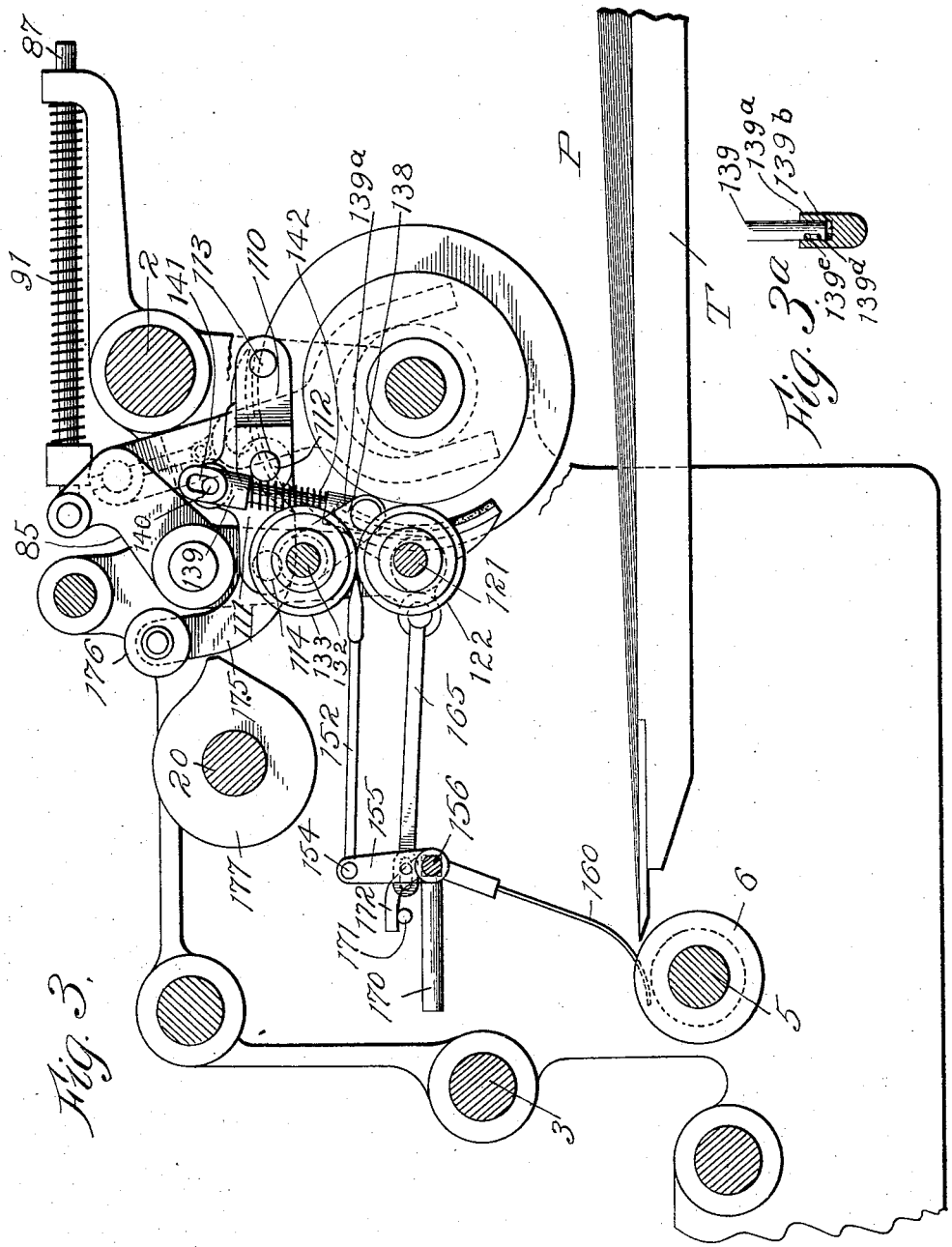
Figure 4:
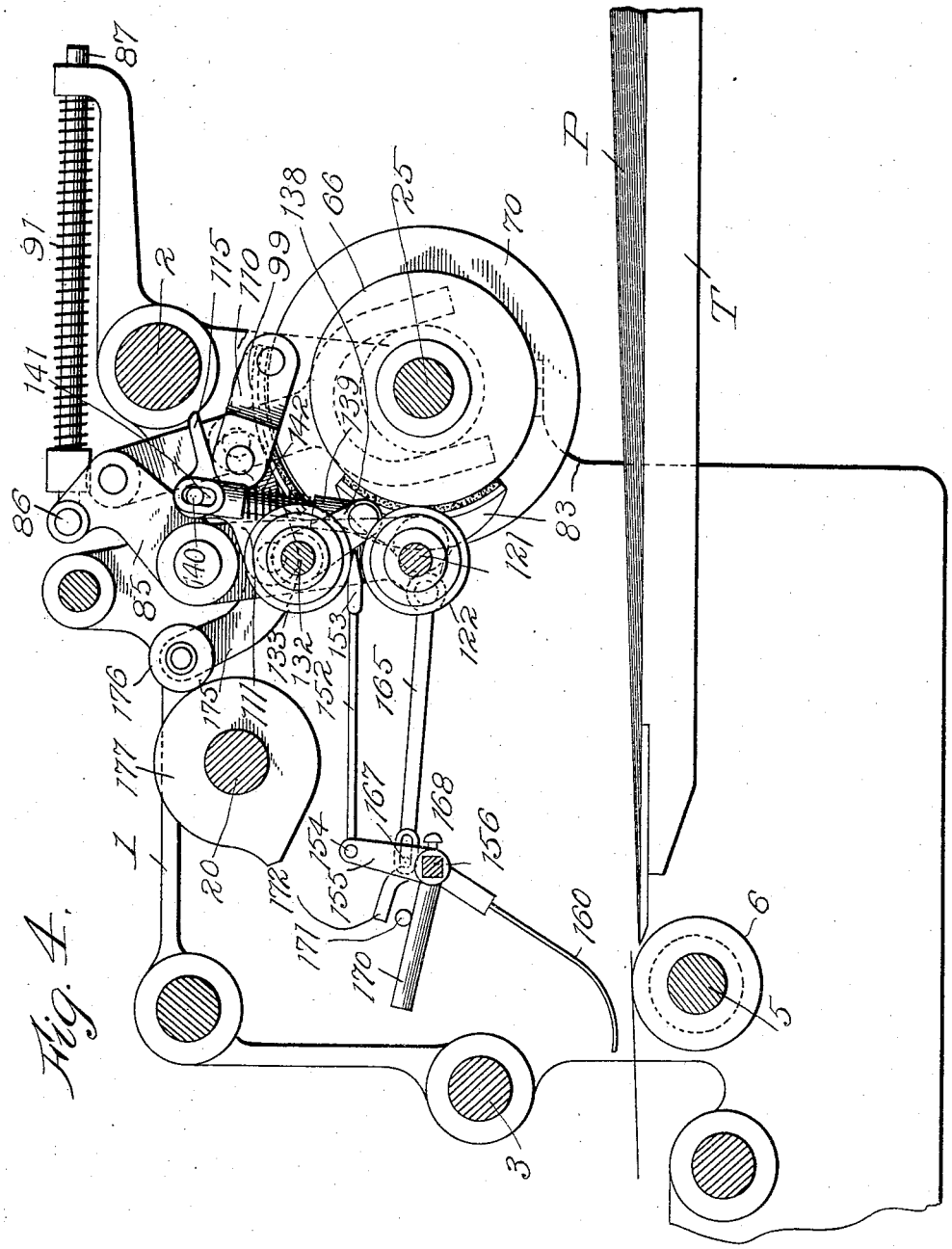

In said drawings: Figure 1 is a vertical longitudinal central sectional view of part of a paper feeding machine embodying my present improvements. Fig. 2 is a plan view of the same. Fig. 3 is a view similar to Fig. 1 with the comber and other parts omitted for the sake of clearness, showing the comber operating and controlling mechanisms in the position assumed while the comber is operating. Fig. 3ª is a detail sectional view of a part. Fig. 4 is a similar view showing the same parts in the position assumed when the comber is arrested. Fig. 5 is a view similar to Fig. 1 showing the combing wheel elevated and the drop roller delivery mechanism lowered, some of the parts of the machine being omitted for the sake of clearness. Fig. 6 is a detail rear elevation of part of the comber driving and controlling mechanisms, illustrating particularly the operation of the automatically controlled friction brakes. Fig. 7 is a sectional side elevation of the same. Fig. 8 is a detail vertical longitudinal sectional view of a part of the drop roller controlling mechanism. Fig. 9 is a detail transverse sectional view of the same taken on the line 9—9 of Fig. 8. Fig. 10 is a detail horizontal sectional view taken on the line 10—10 of Fig. 8. Fig. 11 is a longitudinal sectional elevation of the machine showing particularly the improved tail grip mechanism. Figs. 12 and 13 are detail views of parts of the same. Fig. 14 is a detail plan view of the main parts of the mechanism shown in Fig. 11. Fig. 15 is a diagrammatic plan view illustrating the general arrangement of the essential parts of a feeding machine embodying my present improvements.

Combing feeding machines of the type to which my present improvements apply are usually constructed in the form known to the trade as the "continuous feeder" in which a supply table is mounted above a feed table and connected therewith through a suitable pile reversing throat or passageway. My improvements may however be applied to a combing feeding machine in which the sheets are supported upon an automatically adjustable table.

In the accompanying drawings, I have illustrated my improvements as applied to a machine of the continuous type, only the lower part of the machine being shown, since my present improvements are confined to the mechanism for controlling and feeding the sheets from the feed table.

In machines of the type to which my improvements apply, it is customary to employ two sets of sheet feeding devices arranged upon opposite sides of the central longitudinal plane of the machine with independent controlling devices to equalize the feeding action. I have shown particularly only one set of sheet feeding and controlling mechanisms in the accompanying drawings, but it will be understood that it is my intention to employ two of such mechanisms with independent controlling devices as is now common in this art.

The frame work of my improved machine may be of any suitable construction to properly support the working parts hereinafter referred to.

In the drawings, 1 represents the vertical side frames of the machine which are suitably braced by transverse stay-rods or bars 2 and 3 and by the fixed central vertical frame piece 4 and the transverse shafts and other frame parts which are hereinafter specifically referred to. Within the side frames is supported a suitable feed table T for carrying the feathered out bank of sheets indicated by the letter P. 5 is a constantly driven shaft carrying the lower grooved feed rollers 6. 10 are the drop rollers journaled in the rock arms 11 extending forwardly from the transverse rock shaft 12. The shaft 12 extends from side to side of the machine and is provided at one end with a rock arm 13 to which is pivotally connected a pitman 14 formed with a slotted guide portion 15 through which the cam shaft 20 extends. The upper end of pitman 14 carries an anti-friction roller 16 which is adapted to be periodically engaged by cam 17 keyed to the cam shaft 20. The construction and arrangement of these parts is such that the drop rollers 10 will be held in elevated position during a half revolution of the shaft 20, and will be permitted to be lowered into frictional engagement with the under rollers 6 during the other half of the revolution of said shaft. Suitable mechanism is provided for controlling the operation of the drop roller delivery mechanism to prevent the feed of sheets from the machine when the sheets fail to reach squared or registered position prior to the action of the drop roller mechanism. This controlling mechanism will be hereinafter explained.

The cam shaft 20 extends from side to side of the machine and is journaled in the side frames 1 and the central frame 4 above referred to. The shaft 20 may be operated in any suitable manner. I have not thought it necessary to show the operating mechanism for the said shaft since it is a common part of machines of this type, and particularly the form of such machines which have been developed by me.

25 is a comber operating shaft which also extends transversely of the machine parallel with the cam shaft 20 and is journaled in the same frame parts 1 and 4. This shaft 25 may be driven in any suitable manner (not shown), it being understood that the driving mechanism is such that the shaft 25 will be continuously rotated while the machine is in operation as fully explained in my above-named applications.

40 represents the sheet combing wheels of ordinary construction. I may employ one or more combing wheels at each side of the machine. These combing wheels 40 are adjustably mounted upon two long transverse shafts 41, each of which extends approximately one half the width of the machine and is freely journaled in the rear ends of parallel rock arms 43 pivotally mounted upon the comber operating shaft 25. These rock arms 43 are coupled or connected in pairs by means of the transverse bars 44 each of which is secured at its opposite ends in the upwardly projecting arms 45 which extend from and are preferably integrally connected with the hub portions of a pair of rock arms 43.

46 is a yoke-shaped link or coupling fitting over each bar 44 and provided with a set screw 47 which is adapted to engage the bar 44 for detachably securing the coupling 46 thereto. This link or coupling 46 extends forwardly from the bar 44 and has pivotally connected to it at 48 a pitman 49 extending forwardly and formed with a horizontal guide loop or slot 50, through which the cam shaft 20 extends for supporting and guiding said pitman. The rear end of this pitman 49 carries an antifriction roller 51 which runs in peripheral engagement with a cam 52 keyed to the shaft 20 alongside of the pitman 49. The purpose of this cam and pitman connection with the comber supporting rock arms is to intermittently raise the combing wheels from the pile of sheets at times corresponding with the operation of the sheet delivery drop roller mechanism to which the combing wheels supply the sheets. It will be understood that the cam mechanism for periodically raising and lowering the combing wheels is entirely separate and distinct from the automatic sheet actuated controlling devices which independently arrest the operation of the combing wheels without elevating them. Each comber supporting shaft 41 has keyed to it a small gear wheel 60 which meshes with and is driven by a similar gear wheel 61 journaled upon a boss 62 projecting inwardly from one of the rock arms 43. The gear 61 meshes with and is driven by a larger gear 64 keyed to or formed integral with a bearing sleeve 65 freely journaled upon the shaft 25. This sleeve 65 carries a large friction wheel 66 which rotates with the gear 64 and forms part of the mechanism for controlling the stopping and starting of the rotation of the combing wheels.

The bearing sleeve 65 extends through and is journaled in the side frame 1 and has freely journaled upon it on the outside of the side frame a cylindrical gear casing 70 whose outer surface constitutes the second friction wheel or drum. This casing 70 is designed to carry the planetary gear mechanism by which motion is communicated from the shaft 25 to the comber driving sleeve 65. This planetary gear mechanism is not specifically shown in the accompanying drawings, but it will be understood with particular reference to my above named application Serial No. 453,948 filed September 21, 1908, in which it is fully illustrated and described. It is thought to be sufficient to state here that the gear casing 70 carries two or more short shafts parallel with the comber driving shaft 25, which short shafts carry pairs of planetary gears which mesh respectively with gears upon the sleeve 65 and shaft 25. The purpose of this planetary gear arrangement between the shaft 25 and the sleeve 65 is the same as explained in my said application Serial No. 453,948, viz: to provide for the continuous rotation of the driving shaft 25 and by arresting either the sleeve 65 or the gear casing 70 to arrest or cause the rotation of the combing wheels. This control of the planetary gear connection between the driving shaft 25 and the combing wheels is effected in the present application through the medium of sheet controlled friction brakes upon the same general plan as in my said application, but through specific mechanism of a different construction, which I will now describe.

Journaled upon a heavy stud 80 projecting inwardly from one of the side frames 1 is a downwardly extending heavy rock arm 81 having pivotally mounted upon its lower end at 82 a curved brake shoe 83 which is presented in the same vertical plane as the friction wheel 66 upon sleeve 65. Extending rearwardly from the pivot 82 is a guide yoke 84 which straddles the sleeve 65 and serves to guide the brake shoe 83 in its movements toward and away from the friction wheel 66.

Projecting upwardly from the supporting bearing of the rock arm 81 is an integral rock arm 85 having pivotally connected to it at 86 a rearwardly extending rod 87 which passes through a guide lug 88 of a bracket 89. This rod 87 has mounted upon it between the guide lug 88 and an adjustable block or collar 90 an expansion spiral spring 91 which tends to move the lever 81—85 in the direction for pressing the brake shoe 83 against the friction wheel 66. The rock arm 85 also carries in its upper end an outwardly projecting pin or bolt 96 upon which is journaled at 97 a downwardly presented guide yoke 98 which straddles the bearing hub 70ª of gear casing 70 and carries a curved brake shoe 99 which is pivotally mounted upon a pin 100 projecting from a guide block 101 free to move in a horizontal slot 102 formed with the guide yoke 98. A guide pin 103 is pivoted to the guide block 101 at 104 and projects up through an opening in the journal pin 96 and has confined upon it between pin 96 and pivot pin 104 a small expansion spiral spring 105.

It will be observed that the brake shoes 83 and 99 are preferably provided with facings of some suitable friction material such as leather. The mounting of these brake shoes upon the main supporting and operating lever 81—85 is such that when the brake shoe 83 is in frictional engagement with the friction wheel 66, the brake shoe 99 will be out of engagement with the friction drum or gear casing 70, and vice versa.

For the purpose of holding the spring 91 under compression with the brake shoe 99 in engagement with the gear casing 70, and the brake shoe 83 removed from the friction wheel 66, I have designed an improved sheet controlled toggle mechanism which will now be described. 110 and 111 are toggle links centrally pivoted at 112, the link 110 being freely pivoted to a stud or pin 113 projecting inwardly from one of the machine side frames 1, while the link 111 is pivoted at 114 to the rock arm 81 above referred to. A finger 115 is formed integral with the link 111 adjacent to the pivot 112 for the purpose of engaging the upper edge of the link 110 when the toggle links are straightened out in alinement for the purpose of limiting the straightening movement of the toggles.

Freely journaled in a forwardly projecting bracket arm 120 is a short shaft 121 carrying a friction wheel 122 and a small gear wheel 123, said gear wheel being in constant mesh with a larger gear 124 journaled at 125 and driven by a small gear 126 keyed to the shaft 25. 130 is a rock arm journaled upon a pin or stud 131 projecting inwardly from the machine frame and carrying in its forward end a short shaft 132 upon which are mounted the friction wheel 133 and the small gear wheel 134. The rock arm 130 has a very slight up and down motion, it being limited in its movements by the lugs 135 and 136 of the bracket frame between which it projects. The gear 134 meshes with and is driven by the gear 123 and the friction wheels 122 and 133 are arranged in the same vertical plane with the latter slightly above the former. Projecting downwardly from the journal end of the rock arm 130 is an arm 138 to the lower end of which is pivotally connected a link or pitman 139 extending upwardly therefrom and having pin and slot connection 140—141 with the toggle link 111. This connection with toggle link 111 is of the pin and slot form to provide "lost motion" between the parts and allow for the greater extent of movement of the toggle than the arm 138. This link connection 139 preferably comprises the upper headed link portion having the described pin and slot connection with the toggle link 111 and a head 139$^a$ pivotally connected to the arm 138 and formed with a socket 139$^b$ in which the pin portion of the link 139 is slidingly seated and confined by a transverse pin 139$^c$ engaging a flat face 139$^d$ as shown in Fig. 3$^a$; a short stiff compression spiral spring 142 being confined between the two heads of the link to afford a slight yield between arm 138 and toggle link 111 for the purpose presently to be explained.

A bracket arm 150 projects forwardly from the journal of shaft 121 and carries a freely journaled grooved roller 151 upon which is supported a rearwardly projecting rod 152 having a wedge 153 at its rear end which is normally presented just in front of the bight of the separated friction wheels 122 and 133. This rod 152 is pivotally connected at its forward end 154 with a rock arm 155 secured to a squared rock shaft 156, which extends from the central frame piece 4 to one of the side frames 1 of the machine, the ends of said rock shaft 156 being turned round to form proper journals. A downwardly projecting tripping finger 160 is adjustably mounted upon the squared rock shaft 156 and is adapted to be supported thereby in the groove of one of the under feed rollers 6, above referred to.

A link 165 is pivotally connected at 166 with the lower end of the rock arm 81, and extends forwardly therefrom to the upwardly projecting rock arm 155 on rock shaft 156 and has pin and slot connection 167—168 with said arm 155 for the purpose of holding the tripping finger 160 above the path of sheets while the combing wheel is arrested. The pin and slot connection 167—168 permits the action of the toggle-resetting cam 177 without injury to the tripping finger in the event of the presence of the sheet beneath the tripping finger when said cam acts.

The purpose of setting the described tripping mechanism with the friction wheels 122 and 133 slightly separated (in practice I prefer to arrange these wheels about 1/32 of an inch apart) is to avoid as much as possible any strain upon the sheet and tripping finger in forcing the wedge 153 between the wheels. With these friction wheels slightly separated, it will be observed that the wedge will enter between the wheels more easily to cause a sufficient further separation of the wheels to trip the toggle mechanism. A further necessity for having the wheels 122 and 133 slightly separated results from the fact that if either of these wheels chances to be slightly out of true, it will not trip the toggle, as would be the case with an uneven wheel if the surfaces of the two wheels were run in contact. The slight separation between the two friction wheels is sufficient to allow for any slight irregularities in the wheels.

The importance of forming the link 139 in two parts with a stiff spring 142 normally holding them in extended position is to permit the straightening of the toggle mechanism by the resetting cam without injury to the mechanism in chance cases of the wedge 153 remaining between the friction wheels at the moment when the resetting cam is brought into action. This action is sometimes caused by the failure of the sheet to move forward squarely from the machine so that it fails to trip both tripping fingers but remains under one of the tripping fingers and prevents the withdrawal of the tripped wedge. In the event of the wedge remaining between the friction wheels when the resetting cam acts, it will be understood that the connecting rod 139 will yield an amount equal to the thickness of the wedge while the cam is forcing the toggle into straightened or locked position. The toggle will of course be immediately afterward broken upon the passing of the cam due to the expansion of the spring upon link 139. While this yielding link connection permits the momentary straightening of the toggle links under the circumstance just explained, it will of course be understood that normally this sectional link 139 acts as a solid connecting link, the strength of the spring being sufficient to break the toggle in the normal operation of the machine. The use of a squared rock shaft 156 for the tripping finger 160 permits the ready adjustment of the tripping finger transversely of the machine without danger of disarranging the operative relation of the tripping finger and wedge 153.

170 is a weighted arm projecting forwardly from the rock shaft 156 for holding the parts in normal position with the tripping finger 160 in the path of the sheets as shown in Figs. 1 and 3 of the drawings. This weighted arm 170 is adapted to engage a stop pin 171 projecting inwardly from the side frame 1 to limit the movement of the parts in one direction. A short arm 172 projects forwardly from the rock shaft 156 to engage the stop pin 171 for the purpose of limiting the movement of the parts connecting the rock shaft 176 in the opposite direction.

The toggle link 111 is extended forwardly beyond its pivoted connection 114 with the arm 81 to form the upwardly projecting rigid extension arm 175 carrying in its free end an anti-friction roller 176 which is presented in the vertical longitudinal plane of a resetting cam 177 which is keyed to the cam shaft 20. The purpose of this cam 177 is to straighten the toggle links 110 and 111 and reset the spring 91 and brake operating lever above referred to.

The rock shaft 12 of the drop roller delivery mechanism carries a forwardly projecting rock arm 180 to the forward end of which at 181 is pivoted the lower end of a vertically movable yoke-shaped frame 182 having its two upright arms extending upon opposite sides of the central longitudinal frame piece 4. Guide pins 183 are mounted in said frame piece 4 and project upon opposite sides thereof into engagement with the vertical elongated slots 184 formed in the arms of said yoke-shaped frame 182. Each of the arms of the frame 182 is formed with a notch or shoulder 185 for the engagement of an independent dog or pawl 186. These pawls or dogs 186 are pivotally mounted at 187 upon opposite sides of the central frame 4 in proper position to engage the notches or shoulders 185 of the frame 182 just referred to.

As explained above, there are two independent sheet combing mechanisms arranged upon opposite sides of the machine. Each of these sheet combing mechanisms is operated and controlled by an independent mechanism such as above described, the only parts in common between the two sets of mechanism being the cam shaft 20 and the comber operating shaft 25. It will of course be understood that the cam shaft 20 carries upon opposite sides of the machine duplicate sets of cams such as already explained.

Each of the sheet combing mechanisms is controlled by an independent sheet actuated tripping mechanism, it being understood that there are two independent rock shafts 156 extending transversely of the machine from the central frame 4 to the side frames.
The drop roller mechanism is a single delivery mechanism in which all of the drop rollers are mounted upon a common rock shaft 12, but said drop roller delivery mechanism is independently controlled by each of the sheet actuated tripping devices so that in the event of the failure of the sheet to reach registered position at either side of the machine, the drop roller mechanism will be held out of operation by reason of the engagement of one of the pawls or dogs 186 with the notch or shoulder 185 of the frame 182. This result is accomplished by connecting each dog or pawl 186 through a link 188 with a rock arm 189 extending up from each of the rock shafts 156. In this manner it will be observed that each of the pawls or dogs 186 is independently controlled by one of the sheet actuated tripping fingers 160.

In Figs. 11, 12, 13 and 14 of the drawings, I have shown my improved tail grip mechanism for holding the bank of sheets intact, as each sheet is fed from the pile. At each side of the bank supporting table T near the rear end thereof, I provide an adjustable bracket 200 which is mounted upon suitable longitudinal track-bars 1ª so as to be capable of adjustment forward and back above the bank of sheets. These brackets 200 support in their upwardly projecting arms 201 a rock shaft 202 which extends from side to side of the machine. This rock shaft carries a pair of rock arms 203 (only one of which is shown), each one of which has a pin and slot connection 204—205 and a spring connection 206 with a longer rock arm 207, the pin 204 projecting inwardly from arm 203 into engagement with the slot 205 which is formed in the arm 207 concentric with the rock shaft 202. These long rock arms 207 carry in their forward ends a freely journaled shaft 208 upon which are adjustably secured the depending tail grips 209 which are adapted to engage the bank of sheets. This shaft 208 has secured to it at one end (or both ends) a downwardly projecting rock arm 210 carrying in its lower end the anti-friction roller 211 which operates in the vertical guide-way 212 formed in the inner face of the bracket 200.

A rock shaft 215 extends longitudinally of the machine at one side thereof and is journaled in suitable bracket arms, one of which is shown at 216. This rock shaft 215 has splined to it an outwardly and upwardly curved rock arm 217, bearings 218 and 219 projecting inwardly from the bracket 200 upon opposite sides of the hub of said rock arm 217 for causing said rock arm to be adjusted longitudinally of the shaft 215 when the brackets 200 are moved longitudinally of the machine. This rock arm 217 is connected through a link or pitman 220 with a short rock arm 221 fixed to the outer end of the transverse rock shaft 202 above referred to.

The longitudinal rock shaft 215 has keyed to it at its forward end a rocker lever 225 to one arm of which at 226 is pivoted an upwardly projecting pitman 227 formed with a guide loop 228 at its upper end which guides upon the cam shaft 20 and carries an anti-friction roller 229 which operates in peripheral engagement with a cam 230 keyed to the shaft 20. To the opposite arm of the rocker lever 225 is pivoted at 231 an upwardly projecting rod 232 which passes through an opening formed in a pin or stud 233 projecting inwardly from one of the side frames 1 of the machine. This rod 232 supports an expansion spiral spring 234 which is confined between the stud or pin 233 and an adjustable collar 235 upon the rod.

The brackets 200 are formed with downwardly projecting arms 200ª in which is journaled an adjusting shaft 240 extending from side to side of the machine beneath the table T. This shaft 240 carries small gear wheels 241 which mesh with longitudinal rack bars 242 secured to the frame beneath the table. A hand wheel 243 keyed to the shaft 240 enables the operator to conveniently adjust the frame of the tail grips longitudinally of the machine, the bracket bearings 218 and 219 causing the operating rock arm 217 to be shifted with the supporting frame. From this construction of the tail grip mechanism, it will be observed that by the operation of the cam 230, the shaft 215 will be caused to rock the shaft 202, which, through the spring connection between rock arms 203 and 207 will cause the tail grips 209 to be moved down into engagement with the bank of sheets, with a spring pressure, and through the pin and slot or "lost motion" connection 204—205, will cause the tail grips to be positively moved up away from the bank. By reason of the "lost motion" and spring connections between the rock arms referred to, the variations in the thickness of the bank upon the table will not affect the operation of the tail grips, since the springs 206 will yield more or less to suit the varying requirements and the lost motion will permit the full stroke of the rock shaft under the action of the cam. The provision of the vertical guide-ways upon the brackets to engage rock arms upon the freely journaled shaft 208 causes the tail grips to move into engagement with the bank of sheets in a vertical plane, so that the variation in thickness of sheets will not affect the action of the tail grips upon the bank.

In Fig. 15 of the drawings, I have represented diagrammatically the two sets of automatically controlled sheet combing mechanisms, each sheet combing mechanism being operated and controlled by mechanism arranged at one side of the machine. This mechanism is in a fixed position and the adjustment of the combing devices transversely of the machine is provided for by the length of the comber supporting shafts 41. Each combing wheel may be adjusted transversely upon its shaft without the necessity for shifting the operating mechanism. In the same manner, each of the sheet controlled tripping fingers 160 may be adjusted transversely of the machine upon its supporting rock shaft 156 without changing the position of any of the other parts connected therewith.

The operation of my improved machine will be understood from the following explanations:

The machine is set into operation with both sets of automatically controlled sheet combing mechanisms in the position shown in Figs. 1 and 3 of the drawings. In this position of the parts, it will be observed that the delivery drop rollers 10 are locked in elevated position by the engagement of the dogs or pawls 186 with the shoulders upon the frame 182. It will also be observed that the toggle links 110 and 111 are straightened out in alinement, holding the springs 91 under compression and the levers 81—85 in retracted position with the brakes 83 moved away from the friction wheel 66 and the brakes 99 in frictional contact with the gear casings or drums 70 to hold said casings 70 against rotation. This position of the parts causes the rapid rotation of the combing wheels which are in engagement with the top of the bank of sheets upon the table T. During this combing operation, the tail grips are held in elevated position, the relation of the tail grip cams with the comber controlling cams being clearly shown in Fig. 11 of the drawings. This operation continues at both sides of the machine until the leading edge of the sheet at one side reaches and actuates one of the tripping fingers 160, with the result that the movement of the tripping finger moves the wedge 153 rearwardly into the bight of the coöperating constantly driven friction rollers 122 and 133, which rollers draw said wedge between them and elevate the roller 133 and rock arm 130, and through the connection 138—139 break the toggle 110—111, permitting the spring 91 to expand and act upon the lever 81—85, throwing the brake shoe 83 into engagement with friction wheel 66 and withdrawing the brake shoe 99 from its engagement with the gear casing or drum 70. This operation of the parts immediately stops the rotation of the combing wheel at that side of the machine upon which the tripping finger 160 was actuated with the result that the movement of the sheet at that side of the machine is arrested.

The arrest of operation of the combing wheel at the opposite side of the machine takes place in the same manner when the leading edge of the sheet at that side reaches registered position and actuates the second tripping finger 160. The continued operation of the second combing wheel after the arrest of the operation of the first combing wheel, effects the straightening or squaring of the leading edge of the sheet in delivery position. Immediately after both combing wheels are arrested, the drop roller delivery mechanism and the tail grip mechanism come into action for feeding from the machine the separated top sheet and for holding the bank of sheets in place during its delivery, the controlling cams of the combing wheels at the same time raising the combing wheels away from the bank of sheets to free the top sheet to the action of the delivery mechanism. As each combing wheel is arrested in the manner explained, it will be observed that the connection 165 between rock arm 81 and rock arm 155, will hold the tripping finger 160 elevated out of the path of the sheet. It will also be observed that the same connection will hold the pawl or dog 186 out of the path of the shoulder 185 of the drop roller controlling frame 182. Immediately following the delivery of the sheet by the drop roller mechanism, the resetting cams 177 and comber controlling cams 52 come into action for resetting the toggle mechanism for starting up the rotation of the combing wheels and for lowering the rotating combing wheels into engagement with the bank of sheets, when the operation is repeated in the same way as above explained.

What I claim is:

1. In a paper feeding machine, the combination of a sheet support, with a sheet feeding instrument, means for operating said instrument, mechanism for arresting the operation of said instrument, a toggle mechanism normally restraining said arresting mechanism, and sheet actuated wedging means adapted to actuate said toggle mechanism for releasing said arresting mechanism.

2. In a paper feeding machine, the combination of a sheet support, with a sheet feeding instrument, means for operating said instrument, spring actuated mechanism for arresting the operation of said instrument, a toggle mechanism normally restraining said spring actuated mechanism, and sheet actuated wedging means adapted to actuate said toggle mechanism for releasing said spring actuated mechanism.

3. In a paper feeding machine, the combination of a sheet support, with a sheet feeding instrument, a driving shaft, gearing between said shaft and said instrument, spring actuated mechanism for arresting the operation of said instrument, a toggle mechanism normally restraining said spring actuated mechanism, and a sheet actuated wedge adapted to actuate said toggle mechanism for releasing said spring actuated mechanism.

4. In a paper feeding machine, the combination of a sheet support, with a sheet feeding instrument, means for operating said instrument, mechanism for arresting the operation of said instrument, a toggle mechanism normally restraining said arresting mechanism, coöperating friction wheels, a movable support for one of said friction wheels having a suitable connection with said toggle mechanism, and a sheet actuated wedge adapted to be presented between said friction wheels for actuating said toggle mechanism.

5. In a paper feeding machine, the combination of a sheet support, with a sheet feeding instrument, means for operating said instrument, spring mechanism for arresting the operation of said instrument, a toggle mechanism normally restraining said spring mechanism, coöperating friction wheels, a movable support for one of said friction wheels having a suitable connection with said toggle mechanism, and a sheet actuated wedge adapted to be presented between said friction wheels for actuating said toggle mechanism.

6. In a paper feeding machine, the combination of a sheet support, with a sheet feeding instrument, means for operating said instrument, mechanism for arresting the operation of said instrument, a toggle mechanism normally restraining said arresting mechanism, coöperating friction wheels, a movable support for one of said friction wheels having a suitable connection with said toggle mechanism, a sheet actuated wedge adapted to be presented between said friction wheels for actuating said toggle mechanism, and means for resetting said arresting mechanism and toggle mechanism.

7. In a paper feeding machine, the combination of a sheet support, with a sheet feeding instrument, means for operating said instrument, mechanism for arresting the operation of said instrument, mechanism normally restraining said arresting mechanism, coöperating friction wheels, a movable support for one of said friction wheels having a suitable connection with said restraining mechanism, said friction wheels being supported out of peripheral contact, and a sheet actuated wedge adapted to be presented between said friction wheels for actuating said restraining mechanism.

8. In a paper feeding machine, the combination of a sheet support, with a sheet feeding instrument, means for operating said instrument, mechanism for arresting the operation of said instrument, mechanism normally restraining said arresting mechanism, coöperating friction wheels, a movable support for one of said friction wheels having a suitable connection with said restraining mechanism, suitable gearing positively driving said friction wheels in opposite directions, and a sheet actuated wedge adapted to be presented between said friction wheels for actuating said restraining mechanism.

9. In a paper feeding machine, the combination of a sheet support, with a sheet feeding instrument, means for operating said instrument, mechanism for arresting the operation of said instrument, mechanism normally restraining said arresting mechanism, coöperating friction wheels supported out of peripheral contact, a movable support for one of said friction wheels having a suitable connection with said restraining mechanism, suitable gearing positively driving said friction wheels in opposite directions, and a sheet actuated wedge adapted to be presented between said friction wheels for actuating said restraining mechanism.

10. In a paper feeding machine, the combination of a sheet support, with a sheet feeding instrument, means for operating said instrument, mechanism for arresting the operation of said instrument, means normally restraining said arresting mechanism, coöperating friction wheels, a movable support for one of said wheels, a spring link connection between said movable support and said restraining means, and a sheet actuated wedge adapted to be presented between said friction wheels.

11. In a paper feeding machine, the combination of a sheet support, with a sheet feeding instrument, means for operating said instrument, spring mechanism for arresting the operation of said instrument, toggle links normally restraining said spring mechanism, coöperating friction wheels, a movable support for one of said wheels, a yielding connection between said movable support and said toggle links, and a sheet actuated wedge adapted to be presented between said friction wheels.

12. In a paper feeding machine, the combination of a sheet support, with a sheet feeding instrument, means for operating said instrument, spring mechanism for arresting the operation of said instrument, toggle links normally restraining said spring mechanism, coöperating friction wheels, a movable support for one of said wheels, a "lost motion" connection between said movable support and said toggle links, and a sheet actuated wedge adapted to be presented between said friction wheels.

13. In a paper feeding machine, the combination of a sheet support, with a sheet feeding instrument, means for operating said instrument, spring mechanism for arresting the operation of said instrument, toggle links normally restraining said spring mechanism, coöperating friction wheels, a movable support for one of said wheels, a spring link arranged between said movable support and said toggle links and having pin and slot connection with said toggle links, and a sheet actuated wedge adapted to be presented between said friction wheels.

14. In a paper feeding machine, the combination of a sheet support, with a sheet feeding instrument, means for operating said instrument, mechanism for arresting the operation of said instrument, means normally restraining said arresting mechanism, coöperating friction wheels, gearing between said wheels, a movable support for one of said wheels, stops limiting said movable support, a yielding connection between said movable support and said restraining means and a sheet actuated wedge adapted to be presented between said friction wheels.

15. In a paper feeding machine, the combination of a sheet support, with a sheet feeding instrument, means for operating said instrument, mechanism for arresting the operation of said instrument, means normally restraining said arresting mechanism, coöperating friction wheels, a movable support for one of said wheels, a yielding connection between said movable support and said restraining means, said connection comprising a two-part link having limited relative movement and a spring confined between the two parts of said link, and a sheet actuated wedge adapted to be presented between said friction wheels.

16. In a paper feeding machine, the combination of a sheet support, with a sheet feeding instrument, means for operating said instrument, spring mechanism for arresting the operation of said instrument, toggle links normally restraining said spring mechanism, coöperating friction wheels, a movable support for one of said wheels, a yielding connection between said movable support and said toggle links, and a sheet actuated wedge adapted to be presented between said friction wheels, said yielding connection comprising a two-part link having limited relative movement and a spring confined between the two parts of said link.

17. In a paper feeding machine, the combination of a sheet support, with a sheet feeding instrument, means for operating said instrument, spring mechanism for arresting the operation of said instrument, toggle links normally restraining said spring mechanism, coöperating friction wheels, a movable support for one of said wheels, a yielding connection between said movable support and said toggle links, and a sheet actuated wedge adapted to be presented between said friction wheels, said yielding connection having a "lost motion" connection with said toggle links.

18. In a paper feeding machine, the combination of a sheet support, with a sheet feeding instrument, means for operating said instrument, spring mechanism for arresting the operation of said instrument, toggle links normally restraining said spring mechanism, coöperating friction wheels, a movable support for one of said wheels, a yielding connection between said movable support and said toggle links, a sheet actuated wedge adapted to be presented between said friction wheels, and a resetting cam acting upon said toggle links to straighten the toggle and restore the spring to normal condition.

19. In a paper feeding machine, the combination of a sheet support, with a sheet feeding instrument, a driving shaft, planetary gear mechanism arranged between said shaft and said instrument, a brake lever carrying brakes upon opposite sides of its fulcrum, each of said brakes being adapted to act upon a part of said planetary gear mechanism for controlling the operation of said instrument, an expansion spring acting upon said brake lever, a toggle acting upon said brake lever in opposition to said spring, and sheet actuated means acting upon said toggle.

20. In a paper feeding machine, the combination of a sheet support, with a sheet feeding instrument, a driving shaft, planetary gear mechanism arranged between said shaft and said instrument, two rotary friction members secured to parts of said planetary gear mechanism, a brake lever carrying brakes upon opposite sides of its fulcrum, each of said brakes being adapted to act upon one of said rotary friction members for controlling the operation of said instrument, an expansion spring acting upon said brake lever, a toggle acting upon said brake lever in opposition to said spring, and sheet actuated means acting upon said toggle.

21. In a paper feeding machine, the combination of a sheet support, with a sheet feeding instrument, a driving shaft, planetary gear mechanism arranged between said shaft and said instrument, a brake lever carrying brakes upon opposite sides of its fulcrum, each of said brakes being adapted to act upon a part of said planetary gear mechanism for controlling the operation of said instrument, an expansion spring acting upon said brake lever, a toggle acting upon said brake lever in opposition to said spring, sheet actuated means acting upon said toggle, and a resetting cam mechanism acting upon said toggle for shifting said brake lever and compressing said spring.

22. In a paper feeding machine, the combination of a sheet support, with a sheet feeding instrument, means for operating said instrument, mechanism for arresting the operation of said instrument including a main controlling lever, an expansion spring acting upon said lever, restraining means acting upon said lever in opposition to said spring, a sheet actuated tripping finger adapted to actuate said restraining means, and a connection between said lever and said tripping finger.

23. In a paper feeding machine, the combination of a sheet support, with a sheet feeding instrument, means for operating said instrument, mechanism for arresting the operation of said instrument including a main controlling lever, an expansion spring acting upon said lever, restraining means acting upon said lever in opposition to said spring, a sheet actuated tripping finger adapted to actuate said restraining means, and a "lost motion" connection between said lever and said tripping finger.

24. In a paper feeding machine, the combination of a sheet support, with a sheet feeding instrument, means for operating said instrument, mechanism for arresting the operation of said instrument, a controlling lever included in said arresting mechanism, an expansion spring acting upon said lever, a toggle acting upon said lever in opposition to said spring, a rock-shaft, a sheet actuated tripping finger mounted upon said rock-shaft, means connected with said rock-shaft for tripping said toggle, and a link connected with said controlling lever, and having pin and slot connection with said rock-shaft.

25. In a paper feeding machine, the combination of a sheet support, with two independent sheet feeding instruments arranged at opposite sides of the machine, two independent sheet actuated controlling devices for said instruments, a central frame or bracket, a common sheet delivery drop roller mechanism including a rock shaft, a rock-arm projecting from said rock shaft, a yoke pivotally connected with said rock arm and having its arms projecting upwardly upon opposite sides of said central frame or bracket, and an independent dog or detent operatively connected with each of said sheet actuated controlling mechanisms and adapted to independently engage an arm of said yoke for preventing the operation of said drop roller delivery mechanism.

26. In a paper feeding machine, the combination of a sheet support, with two independent sheet feeding instruments arranged at opposite sides of the machine, two independent sheet actuated controlling devices, one for each of said instruments, each of said controlling devices including a rock shaft carrying a sheet actuated tripping finger, a common sheet delivery drop roller mechanism including a rock shaft, a rock-arm projecting from said drop roller rock shaft, a yoke pivotally connected with said rock-arm, two independent dogs or detents adapted to independently engage said yoke for preventing the operation of said drop roller delivery mechanism, and an operative connection between each dog or detent and one of the trip finger rock shafts.

27. In a paper feeding machine, the combination of a sheet support, sheet feeding devices operating above said support, a frame adjustable longitudinally of the machine, a rock shaft mounted in said adjustable frame, tail grips carried by said rock shaft, an operating shaft extending longitudinally of the machine, a rock-arm adjustably splined upon said operating shaft, brackets extending from said adjustable frame into engagement with said operating shaft upon opposite sides of said rock-arm for causing said arm to be adjusted upon the operating shaft, and a connection between said adjustable rock-arm and said rock shaft as set forth.

28. In a paper feeding machine, the combination of a sheet support, sheet feeding devices operating above said support, a frame adjustable longitudinally of the machine, a rock shaft mounted in said adjustable frame transversely of the machine, tail grips carried by said rock shaft, an operating shaft extending longitudinally of the machine, a rock-arm adjustably splined upon said operating shaft, bearing brackets extending inwardly from said adjustable frame and having bearings upon said operating shaft at opposite sides of said rock-arm for causing said arm to be adjusted upon the operating shaft, a connection between said rock-arm and said rock shaft, and means for adjusting said frame.

29. In a paper feeding machine, the combination of a sheet support, a sheet feeding device operating above said support, a frame adjustable longitudinally of said machine, a rock shaft journaled in said frame, rock-arms loosely mounted upon said rock shaft, tail grips supported from said loosely mounted rock-arms, other rock-arms fixed upon said rock shaft having "lost motion" connection with said loosely mounted rock-arms, and means for operating said rock shaft.

30. In a paper feeding machine, the combination of a sheet support, a sheet feeding device operating above said support, a frame adjustable longitudinally of said machine, a rock shaft journaled in said frame transversely of the machine, rock-arms loosely mounted upon said rock shaft, tail grips supported from said loosely mounted rock-arms, other rock-arms fixed upon said rock shaft having pin and slot connection with said loosely mounted rock-arms, springs connecting said fixed rock-arms with said loosely mounted rock-arms, and means for operating said rock shaft.

31. In a paper feeding machine, the combination of a sheet support, a sheet feeding device operating above said support, a frame adjustable longitudinally of said machine, a rock shaft journaled in said frame transversely of the machine, rock-arms loosely mounted upon said rock shaft, tail grips supported from said loosely mounted rock-arms, other rock-arms fixed upon said rock shafts having pin and slot connection with said loosely mounted rock-arms, springs connecting said fixed rock-arms with said loosely mounted rock-arms, an operating shaft extending longitudinally of the machine, and an adjustable connection between said operating shaft and said rock shaft.

32. In a paper feeding machine, the combination of a frame, a sheet support, a sheet feeding instrument operating above said support, a rock shaft journaled in said frame and extending transversely of said support, rock-arms projecting from said rock shaft, tail grips freely journaled in the forward ends of said rock-arms, a vertical guide upon said frame, and a device connected with said tail grips engaging said guide for causing said tail grips to move toward and away from the sheet support in a vertical plane.

33. In a paper feeding machine, the combination of a sheet support, a sheet feeding instrument operating above said support, a tail grip frame arranged in rear of said sheet feeding instrument and formed with an inwardly presented vertical guide-way, a rock shaft journaled in said frame, rock-arms projecting forwardly from said rock shaft, a shaft freely journaled in the forward ends of said rock-arms, tail grips secured to and depending from said freely journaled shaft, a rock-arm fixed to said freely journaled shaft and engaging said vertical guide-way, and means for operating said rock shaft.

34. In a paper feeding machine, the combination of a sheet support, a sheet feeding instrument operating above said support, vertical side frames arranged upon opposite sides of said support in rear of said sheet feeding instrument, a rock shaft journaled in said side frames and extending transversely of said sheet support, means for operating said rock shaft, rock-arms fixed to and projecting forwardly from said rock shaft and carrying in their forward ends a freely journaled shaft, tail grips fixed to and depending from said freely journaled shaft, a rock-arm fixed to said freely journaled shaft, an anti-friction roller carried by said rock-arm, and a vertical guide-way formed upon the inner face of one of said side frames with which said anti-friction roller engages.

TALBOT C. DEXTER.

Witnesses:
A. C. HAMMOND,
E. B. O. LINDQUIST.